Feb. 4, 1958   E. E. WAGNER   2,821,928
ROTARY DEVICE
Filed Nov. 15, 1954   3 Sheets-Sheet 1

INVENTOR.
Ernest E. Wagner

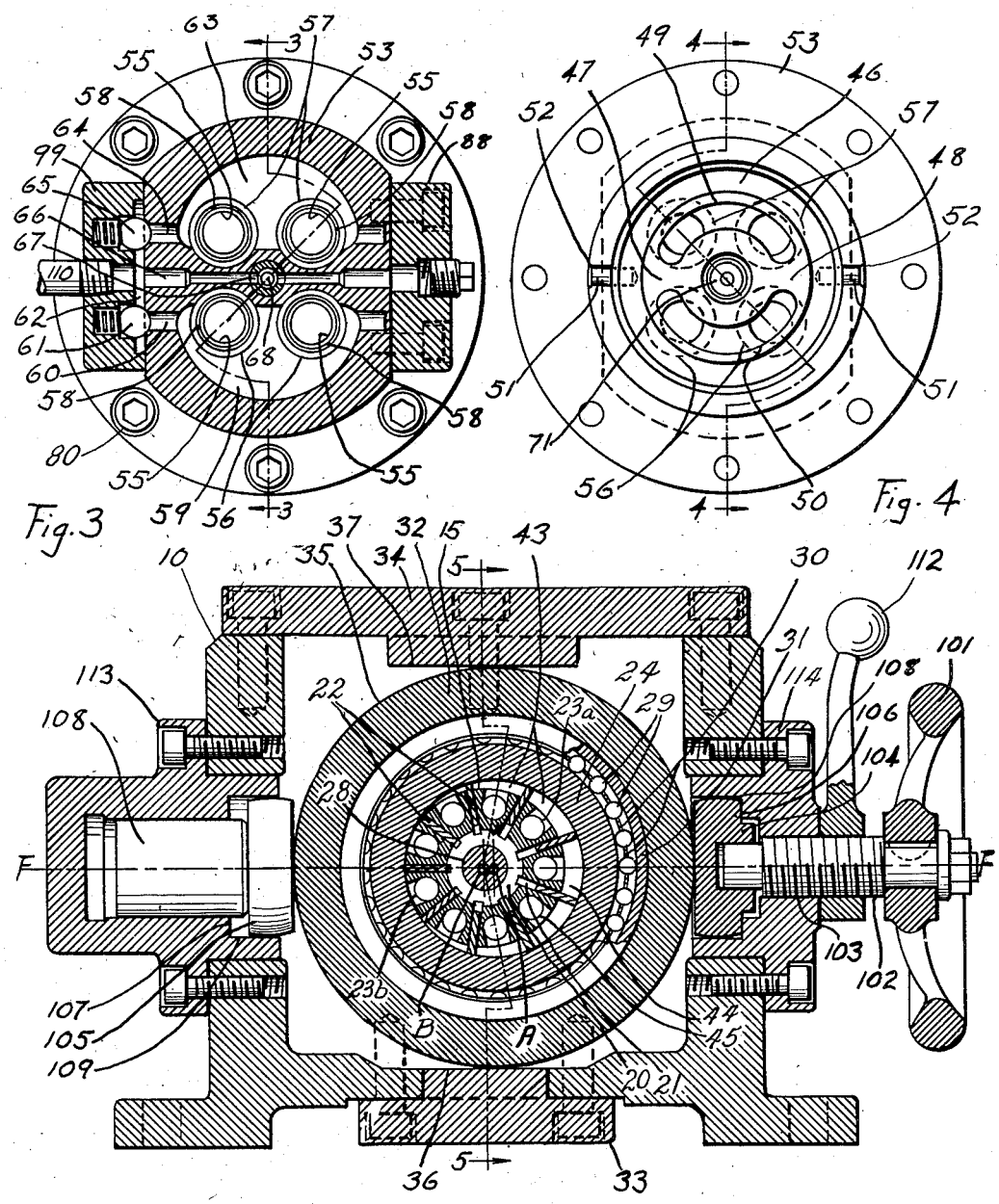

Feb. 4, 1958  E. E. WAGNER  2,821,928
ROTARY DEVICE

Filed Nov. 15, 1954  3 Sheets-Sheet 3

INVENTOR.
Ernest E. Wagner
BY

2,821,928

United States Patent Office

Patented Feb. 4, 1958

2,821,928

ROTARY DEVICE

Ernest E. Wagner, Santa Ana, Calif.

Application November 15, 1954, Serial No. 468,815

11 Claims. (Cl. 103—120)

This invention relates to positive displacement rotary pumps of the fixed as well as variable delivery type.

An essential object of the invention is to provide a device of this character, in which a novel type of assembly is employed, which enables the pump to be used as such and/or as a fluid motor for forward and reverse rotation.

Another object of this invention is to provide a pump and/or fluid motor in which the fluid leakage and friction losses are materially reduced, thereby enhancing the efficiency.

Another object of the invention is to provide a rotary pump and/or motor of the vane type in which the principal hydraulic assembly or actuating and/or actuated part, constitutes an independent, wholly integrated unit that may be quickly associated with a frame, case or other necessary adjunct or component of a rotary pump and/or motor structure, for assembly therewith, and likewise readily dissociated therefrom for inspection, substitution or repair; and in which the integrated unit may be few of parts, readily produced to form a relatively light, efficient and compact rotor element, capable of withstanding high working pressures and in which the union of the rotor element with other elements of a rotary pump and/or motor may be effected by a single mechanical member.

Other objects and advantages will become apparent from the following description in connection with the accompanying drawings in which, Fig. 1 is a longitudinal, composite sectional view substantially along the lines 2—2 of Fig. 2, 3—3 of Fig. 3, 4—4 of Fig. 4 and 5—5 of Fig. 5.

Fig. 3 is a transverse sectional view taken along line 3—3 of Fig. 1.

Fig. 4 is a transverse sectional view taken substantially along the line 4—4 of Fig. 1.

Fig. 5 is a transverse sectional view taken along the line 5—5 of Fig. 1.

Figure 1:
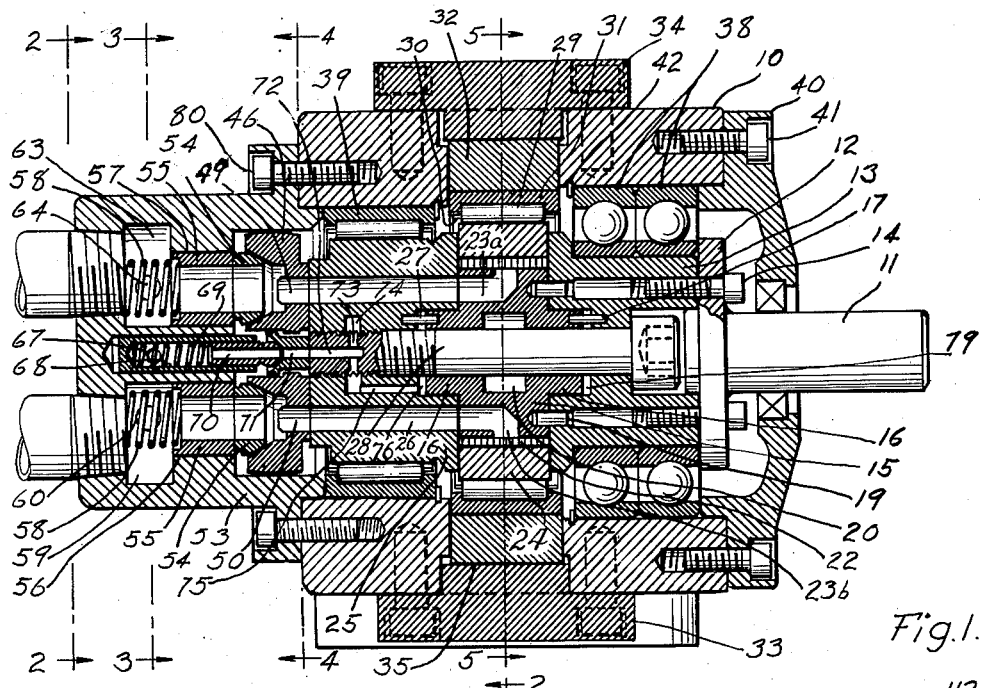
Figure 2:
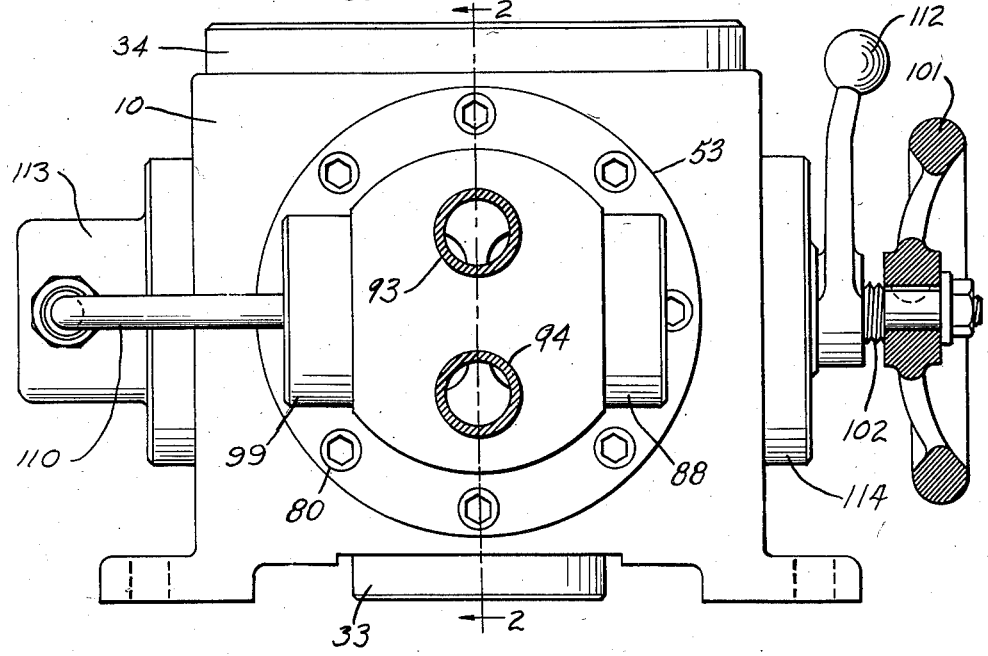
Fig. 2 is a left end view.

While the unit is susceptible to various modifications and alternate constructions, I have shown in the drawings and will herein describe in detail the preferred embodiment, but it is understood that I do not thereby intend to limit the invention to the specific form disclosed, but intend to cover all modifications and alternative constructions falling within the spirit and scope of the invention as expressed in the appended claims.

Referring more particularly to the drawings, my invention comprises a main frame or housing 10.

A shaft 11 serves as input shaft when the unit is operating as a pump and as output shaft when operating as a fluid motor.

A flange 12 integral with the shaft is attached to an end plate 13 by means of bolts 14. The rotor 15 is aligned in the counterbore of the end plate by one of its pilots 16. The two are assembled in timed relationship by means of a dowel pin 17 and each circular ring sector 18—Fig. 6—is individually connected to the end plate 13 by dowel pins 19. Pilots 16 are integral with the rotor body 15 which has a concentric central recess 20, a plurality of radial slots 21—Fig. 6—a like number of vanes 22—Fig. 5—slidably disposed in the slots and a corresponding number of passageways 23, 23a and 23b. A cylindrical ring 24 is adapted to be slipped over the rotor and vanes assembled with the end plate 13.

This ring 24 forms a pumping space which is divided into pumping compartments or pockets 43 hereinafter referred to. The opposite endplate 25 with passageways 26, in number equal to passageways 23, of the rotor, aforementioned, is then assembled on the other rotor pilot 16 in timed relationship by means of dowel 27. The rotor 15 and the two end plates 13 and 25, with the cylindrical ring 24 and vanes 22 of the rotor 15 having a sliding fit between the two end plates, are then bolted together by means of the single central preloading bolt 28, so that in effect the rotor and end plates constitute a single rigid piece with no relative movement between them, while the cylindrical ring can float between the end plates and ride upon the vane tips as they move radially, the whole comprising a cartridge which constitutes the primary working parts of the pump and/or fluid motor. The cartridge can then be inserted into a suitable housing or frame 10 presently described.

A single clamping bolt 28 is provided in the center of the assembly, adapted to be tightened under controlled torque, thereby provided a preload, which compresses the rotor enough for the end plates to bind the close-fitting cylindrical ring 24, unless its width is adjusted to allow for the decrease in the width of the rotor due to compression by the preloading bolt 28. Conversely, were it not for the preload, the fluid pressure would stretch the bolt by forcing the end plates apart and increase the clearance between them and the cylindrical ring, allowing fluid to escape. By preloading the bolt until the end plates exert an axial pressure on the rotor in excess of the greatest axial load which the maximum working presure of the fluid can exert on the end plates, it is possible, with properly proportioned parts to establish an acceptable working clearance between ring and end plates of a few .0001", which for all practical purposes will remain constant irrespective of the pressure variations in the fluid, the latter a reflection of the load imposed upon the unit.

While the inner surface of the ring 24 constitutes the working surface for the vane tips, its outer surface forms the inner race of the antifriction bearing which may comprise miniature rollers 29, cage 30 and outer race 31 which in turn is carried in a cylindrical yoke 32.

To obtain an acceptable design and satisfactory performance, the bearing in the yoke 32 consisting of the outer race 31, needles or miniature rollers 29—rollers which have a large length to diameter ratio—and the inner race or ring 24 must have a cage 30 for spacing the miniature rollers, a preload or negative clearance between the ring 24 and the assembled ring of spaced miniature rollers 29 as well as a press fit between the yoke 32 and the outer race 31, sufficiently heavy to prestress the yoke beyond the maximum stress the greatest operating pressure will generate.

The periphery 35 of the cylindrical yoke 32 bears either on the lower cover plate 33 or the upper cover plate 34, depending upon the direction of rotation of the rotor and the position of the yoke center "A" relative to the rotor center "B." Cover plate surfaces 36, 37 are parallel to the line "F—F" and the cylindrical surface 35 of the yoke is in slidable contact with them. This provides freedom of movement of the yoke center "A" in one plane only, namely along the line "F—F."

Bearings 38 carry combined axial thrust and radial load from the cartridge while bearing 39, concentric with bearings 38 carries a radial load only. Cover plate 40 and bolts 41 clamp bearings 38 against the shoulder 42 in the frame 10, maintaining the cartridge in rigid relative alignment with its co-functioning parts.

Rotor and end plates in bearings 38, 39 rotate about the fixed center "B" while the cylindrical ring 24 in its bearing 29, 30, 31 is forced to rotate about the center "A," adjustable along line "F—F," from a maximum position to the right of "B"—in which position the vanes in contact with the ring, execute the greatest radial movement relative to the rotor slots—through "B"—in which position "A" and "B" coincide, all parts are concentric and no relative movement takes place—to a maximum position to the left of "B"—in which position the vane action is again a maximum.

Referring to—Fig. 5—and assuming clockwise rotation of the rotor, with "A" to the right of "B," it can be seen that the vane pockets 43 throughout the upper half of their rotation are progressively increasing in size while decreasing throughout the lower half. By suitably connecting passages 23, 26, to a source of fluid, in a manner described later, the increasing pockets will be able to draw in fluid, while the decreasing pockets will be able to discharge their contents. The magnitude of this pumping action is proportional to the center distance "A—B," zero when "A" and "B" coincide and a maximum when "A—B" is a maximum.

Reversing the direction of rotation from clockwise to counterclockwise rotation reverses the pumping action. The pockets now are increasing throughout the lower 180° of rotation and decreasing during the upper 180°; the direction of fluid flow has been reversed.

Referring to Fig. 5, again assume clockwise rotation, also a movement of the yoke 32 to the left until "A" reaches a position to the left of "B," then the vanes will be moving radially out during rotation throughout the lower 180° and radially in while rotating through the top 180°. The pockets are increasing over the lower half, decreasing over the upper half, therefore, without reversing the direction of rotation a flow reversal is achieved relative to the direction of flow when "A" is to the right of "B." The position of the yoke 32 with reference to that of rotor 15 controls both the volume and direction of flow through the pump.

The principal characteristic required of a reversible variable delivery vane type pump is geometrical symmetry of the rotor assembly. The center line of the vane slots must run through the center of the rotor—Fig. 6. This characteristic likewise makes it suitable for dual service, that is, for service both as a pump and as a motor, providing certain provisions are made for maintaining contact between vane tips and ring, which will be described in detail herein.

Operation as a pump has been described, its operation as a fluid motor is as follows:

With the parts positioned as in Fig. 5, assume fluid flowing at a uniform rate, the vanes 22 in contact with ring 24, yoke center "A" to the right of rotor center "B" and the incoming fluid conducted to the passages 23a above the center line "F—F"; then rotation must be clockwise, for it is self evident that the liquid can enter only if the pockets are increasing in volume. Progressively the fluid is carried around to the lower half and as the pockets are now decreasing in size the fluid is discharged through the passages 23b below the center line "F—F."

By connecting the incoming fluid to the passages in the lower half of the rotor, rotation is reversed. Likewise, movement of the center "A" to the opposite side of "B" results in a reversal of rotation.

For clockwise rotation and operation as a pump with the parts in relative alignment, as shown in Fig. 5, it has been demonstrated that for the 180° of rotation above the center line "F—F," fluid is drawn in while throughout the lower 180° fluid is discharged. Each pocket reaches either a minimum or a maximum volume just as its radial center line crosses the center line "F—F," which line must pass through the centers of rotation "A" and "B." Pocket 44, in the position shown, has just reached its maximum volume, stopped drawing in fluid through its passage 45 and is about to discharge fluid to the lower 180° phase of its travel. To obtain sufficient pumping action and controlled fluid flow, the passageway 45 must, at this instant, be cut off from the upper half, which is the suction side and connected to the lower half, which is the discharge side.

As pocket 44 progresses around the lower half it discharges fluid through passageway 45 until it again straddles the center line "F—F," at which point it has reached its minimum volume, exactly 180° from the point of maximum volume. At this instant the passageway 45 must again be cut off, but in the reverse order, namely, cut off from the discharge and connected to the suction. Simultaneously the same sequence of action is progressively followed by all the pockets, each in a different phase of the cycle. Passageways 23 (23a and 23b) and their extensions 26 continuously rotate about the fixed center "B" while suction and discharge must remain stationary over their respective halves of the circle. This fact serves as the basis for suitable means of transferring the fluid from suction to discharge.

A plate valve 46 is employed with bridges 47 and 48. Ports 49, 50 are circular ring sectors, shaped to conform to the size and the path of the passageways 26. The plate valve 46 is restrained from rotating by pins 51 in slots 52 in the distributor 53 and held in intimate contact with end plate 25 by spherically shaped elements 54 and tubular compensating pistons 55, which are hydraulically actuated by the pump pressure in the twin bores 56, 57.

The end plate and passageways 23, 26 rotate, the latter drawing fluid from the port 49 and discharging it to the port 50 after passing over the bridge 48 which straddles the center line "F—F" effectively sealing leakage between the adjacent port ends and accurately timing the instant each pocket is cut over from suction to discharge. After discharging the displaceable contents of the vane pockets 43 the passageways pass over the bridge 47 to reenter port 49 and repeat the cycle. Springs 58 bear on the compensating pistons 55 and hold the various parts in initial contact until hydraulic pressure builds up and takes over.

Action of the plate valve is identical whether the unit is operating as a pump or as a fluid motor.

To assure proper and efficient functioning of the unit, liquid must be effectively prevented from escaping the vane pockets, except in minute quantities. Paths of escape are from the pockets 43 past ring 24 to the atmosphere, between the vane ends and the end plates to adjacent pockets under a pressure differential and along the clearances between vanes and vane slots. These paths are actually capillary seals, effectively preventing relatively excessive fluid seepage by reason of the proper combination of clearance between the parts and the viscosity of the fluid, while offering minimum frictional resistance to movement.

A further escape path is over the top of the vanes, between their tips and the ring 24 whenever adjacent pockets have a differential pressure. To prevent this, the vanes 22 must bear against the cylindrical ring 24 and seal by reason of their contact. Failure in this respect is tantamount to loss of pumping action. By applying pressure beneath the vanes, i. e., to the central recess 20, they can be forced into and maintained in contact with ring 24.

The pressure applied to the inner ends of the vanes must be sufficient to balance the pressure in the pockets, raise the vanes against gravity, move them against the opposing sliding friction of the vanes in the slots 21 while traveling radially and keep them in positive contact with the ring. At slow speeds this pressure must necessarily be in excess of the pressure in the pockets because the assisting effect of the centrifugal force is negligible, therefore, the pressure beneath the vanes, at speeds below a certain minimum speed must be boosted above the operating pressure.

Pumps, excepting special installations, operate at speeds well above the minimum and therefore do not require pressure in the central recess 20 in excess of the regular operating pressure, but fluid motors require pressure beneath the vanes in excess of the operating pressure to start and get up speed, even if their normal speed range lies above the minimum.

The volume of the central recess plus the volume of the exposed vane slots is constant under all conditions of operation. As the vanes move in and out fluid is transferred from one vane slot to the next without an overall pumping action, but the pressure causes fluid to seep out along the vanes and although the volume is small due to the close fits employed, this leakage must be made up to maintain the pressure and keep the vanes in contact with the ring.

Means for introducing fluid to the central recess 20 and elevating the operating pressure, where mandatory, are as follows:

When operating as a pump, pressure fluid entering chamber 59 can pass through passageway 60, past the ball check 61 into the chamber 62 in the cover plate 99 or pressure fluid entering chamber 63 can pass through passageway 64 past ball check 65 into the chamber 62. From chamber 62 pressure fluid flows through passageway 66, through opening 67 into space 68, over spring 69, through pivot 70 and socket 71 into the drilled hole 72 in the end of bolt 28.

Pivot 70, socket 71 and the end of bolt 28 are kept in initial contact by spring 68 until fluid pressure builds up and bears on the inner end of pivot 70 forcing it and the socket 71 under hydraulic pressure, proportional to the output of the unit, against the end of bolt 28, the parts being so proportioned and positioned that the thrust of socket 71 counterbalances the hydraulic thrust between the stationary socket and the rotating bolt, to the end that the socket floats axially, selfadjusting the oil film thickness between the rubbing surface to optimum clearance—corresponding to the momentary operating pressure—except as modified by the force of the necessary initial contact spring.

Figure 6:
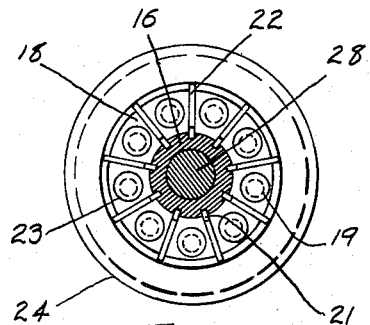
Fig. 6 is a transverse sectional view taken along the line 7—7 of Fig. 7.
Figure 7:
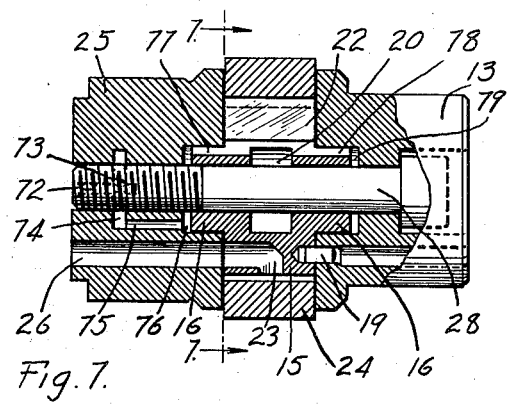
Fig. 7 is a longitudinal section through the assembled cartridge.

Fluid flows from hole 72 in the bolt end through a crossbore 73 in the bolt into recess 74 in the end plate 25 through a plurality of holes 75 into the space 76 between the end plate and rotor pilot 16 from where it can simultaneously—Figs. 6, 7—enter all the inner edges of the vane slots 21 which have been extended the full length of the pilots as at 77, 78 and thereby reach the central recess 20 to supply fluid as demanded by the seepage past the vanes. Fluid can also enter the space 79 through the vane slot ends 78.

All parts related to the plate valve and its compensating mechanism are assembled in the distributor 53, which is then bolted to the frame 10, by means of bolts 80.

Figure 8:
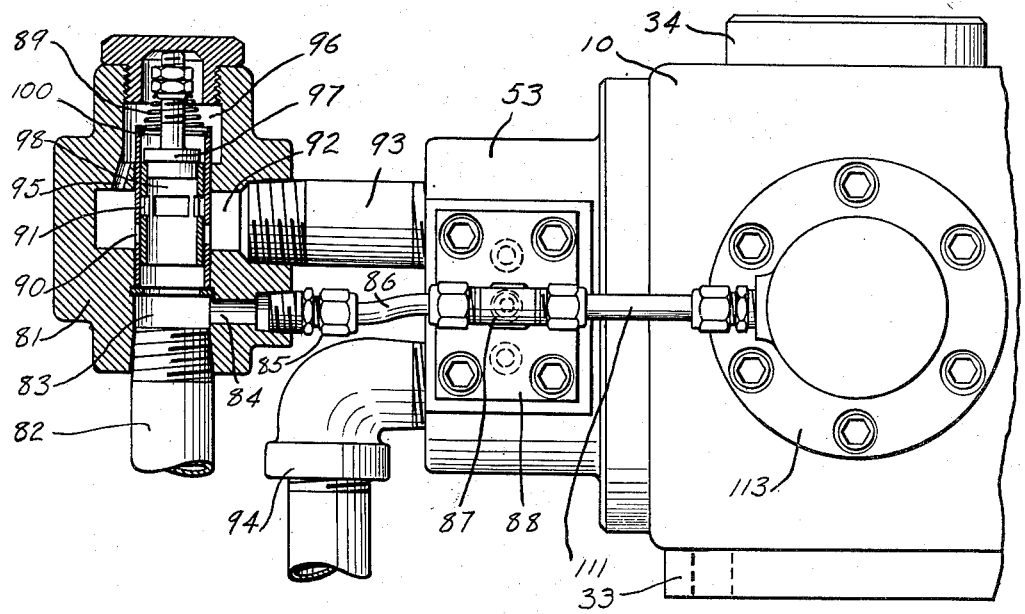
Fig. 8 is a fragmentary side view of the unit with the valve being shown in section.

When operating as a fluid motor, pressure fluid entering valve body 81—Fig. 8—from the system piping 82 enters a closed sleeve valve chamber 83, flows through passageway 84, fittings 85, tube 86 to the T 87, through cover plate 88 to the right hand end of passageway 66, thence to the central recess 20 as described.

As pressure builds up in the valve chamber 83, outer sleeve 100 overcomes the force of the spring 89 and starts to move up. Movement of the sleeve 100 continues until port 90 registers will port 91 and fluid flows into the chamber 92 under a pressure less than that in the valve chamber 83, therefore, pressure in the central recess 20 will be greater than in the vane pockets 44 and the vanes will at all times be in fluid sealing contact with the ring 24. From chamber 92 fluid enters the chamber 63 via pipe 93 driving the fluid motor as described and leaving via fitting 94.

In the event of fluid flowing from the distributor 53 through pipe 93 into chamber 92, that is, in a reverse direction, then pressure will build up in chamber 92, be transferred via hole 95 to chamber 96 and there bear on the closed end 97 of sleeve 98.

As pressure builds up, the force of spring 89 is overcome and sleeve 98 moves down until port 91 registers with port 90 and the fluid can flow from chamber 92 through the ports to the chamber 83 and back to the system.

The entire area of the full diameter of sleeve 98 is subject to fluid pressure, whereas only the area of the metal in the sleeve 100, which is considerably less, is subject to the pressure. As both sleeves are actuated by the same spring 89 the pressure drop through the ports is far less for reverse fluid flow, from 92 to 83, than for flow from 83 to 92.

Means of adjusting the flow rate when operating as a pump, or the speed when operating as a fluid motor, is as follows: Handwheel 101 actuates screw 102 in a threaded bore 103 in cover plate 104. The screw adjusts the position of the yoke 32 along line "F—F" within the limits of travel established by the spherically shaped pieces 104, 105 as they strike the shoulders 106, 107 in their bores 108, 109.

The plunger 108 in the cover plate 113 is supplied with fluid pressure from chamber 62 via the pipe 110 or from the T 87 via the tube 111 and is so proportioned that the yoke 32, under its action, firmly bears against the end of the screw 102 at all times. Lever 112 locks the screw in the selected position.

Means for attaching cover plates 114, 113 to the frame 10 are identical to facilitate right or left hand assembly; likewise dual drilling of the passageways 60, 64 in the distributor 53 permit interchangeability of cover plates 88 and 99, which have identical bolt sizes and spacing.

I claim as my invention:

1. A hydraulic pump of the character referred to, including a housing, and an independent, integrated pumping unit adapted for introduction into and association with said housing, said unit comprising a rotor body having a plurality of radial vanes, a like number of passageways, and a central recess, a plate at each side of said rotor body, a single element passing centrally through one of said plates and rotor and secured in the other plate to form an integrated preloaded cartridge removable as a unit from said housing, said element having passageways in a part thereof for conveying fluid under pressure to said recess to exert pressure on the inner ends of said vanes and maintain the same projected, and a ring surrounding said vanes and rotor and slidingly fitted between said plates.

2. A hydraulic pump of the character referred to, including a housing, and an independent, pumping cartridge adapted for introduction into and dissociation from said housing, said cartridge comprising a rotor having a central recess, and provided with radial vanes and axial passageways between said vanes, a plate at each side of said rotor, one of said plates being provided with an input-output shaft for a direct in line drive, the other of said plates having passageways communicating with the passages in said rotor, a ring surrounding said rotor and vanes and disposed to float between said plates, and a single central member engaging the plates and passing through the rotor to combine them into an integral cartridge and subject them to a predetermined load, said member having passageways in a part thereof for supplying fluid under pressure to said central recess to exert pressure on the inner ends of said vanes and maintain the outer ends thereof in relative sealing contact with said ring.

3. A hydraulic pump of the character referred to, including a housing, and an integrated pumping cartridge adapted for association therewith and for removal in toto therefrom as a unit, said unit comprising a rotor having a central recess and radial slots extending into said recess, vanes slidably operable in said slots, an end plate at each side of said rotor, a cylindrical ring slidable between and relative to said end plates and surrounding said rotor and vanes, a single central bolt uniting said rotor, end plates and ring into an integral preloaded cartridge, passageways for conveying fluid to said central recess to exert pressure on the inner ends of said vanes and maintain same projected beyond the rotor body, and means to boost the fluid pressure in said central recess above the operating pressure in said unit.

4. In a hydraulic pump of the character referred to, a housing, an integrated pumping cartridge adapted for introduction into and separation as a unit from said housing, said cartridge comprising a rotor having slots and vanes slidably disposed in said slots, an end plate at each side of and secured directly to said rotor, a ring encircling said rotor and vanes, a single central member connecting said end plates and rotor into an integral unit and simultaneously exerting on said end plates an axial pressure in excess of the greatest axial load exerted by the maximum working pressure of the fluid on the end plates.

5. In a rotary device of the character referred to, a housing, a rotor body having passageways and a central recess and radial vanes, a ring surrounding said rotor, end plates associated with and directly secured to said rotor, said ring being adapted to float between said plates and cooperating with said vanes and end plates to form pockets, a preloading bolt extending centrally through said rotor and plates and secured in one of said plates to form a withdrawable cartridge, means to supply fluid to said central recess, and valved means to boost the pressure of the fluid in said recess above the operating pressure in said pockets, and maintain the vanes in sealing contact with said ring, said valved means being operable at a reduced pressure upon flow reversal to reduce back pressure.

6. A hydraulic pump of the character referred to, including an independent, integrated rotary pumping cartridge adapted for association with and ready dissociation as a unit from a suitable housing, said unit comprising a rotor having a plurality of vanes slidably disposed therein and fluid passageways between said vanes, a plate at each side of and directly secured to said rotor, one of said plates having inlet-outlet passageways, the outer ends of which terminate in the outer face of said plate and the inner ends of which communicate with the passageways in said rotor, a ring surrounding said rotor and vanes and forming a barrel having a sliding fit between said plates and a centrally disposed non-driving pre-loading member connecting together said plates and rotor and thereby forming an integral unit.

7. A hydraulic cartridge of the character referred to comprising, in combination with a housing, a rotor having a concentric central recess and radial slots extending into said recess at their inner ends, said rotor having vanes and passageways, an endplate at one side of said rotor, means engaging said plate and rotor to hold same assembled in timed relationship, means individually connecting each circular ring sector with said plate, an input-output shaft having a flange, means to connect said flange to said plate, an end plate at the other side of said rotor and provided with passageways extending axially through the endplate, said passageways corresponding to the passageways in said rotor, means engaging said plate and rotor to hold same assembled in timed relationship, a bolt extending centrally through said first-named plate and rotor and having its end secured in said other plate to hold said end plates and rotor under a determined axial preload, said secured end of said bolt having a passageway extending inwardly from the end and centrally thereof, and a cross bore communicating with said central passageway to convey fluid to said concentric central recess to hold said vanes projected, and a ring between said end plates and surrounding said vanes and rotor.

8. In a rotary device of the character referred to, including an integrated rotary unit, a housing therefor, said unit comprising a rotor having vanes and a central recess, fluid passageways between said vanes, an endplate at each side of said rotor, one of said end plates having inlet-outlet passageways in register with the passageways in said rotor, a ring surrounding said rotor and vanes, a central preloading member connecting together said end plates and rotor, a plate valve flexibly held in said housing and provided with passageways for conducting fluid between said housing and the inlet-outlet passageways in said end plate, said plate valve provided with a central opening, a connection in said opening for conducting fluid from said housing to said rotor and the central recess at a pressure in excess of the operating pressure between said vanes.

9. A hydraulic pump of the character referred to, including a housing, and an independent, integrated pumping unit adapted for introduction into and association with said housing, said unit comprising a rotor body having a plurality of radial vanes, a like number of passageways, and a central recess, a plate at each side of said rotor body, a single element passing centrally through one of said plates and rotor and secured in the other plate to form an integrated preloaded assembly, and means for conveying fluid under pressure to said recess to exert pressure on the inner ends of said vanes and maintain the same projected.

10. A hydraulic pump of the character referred to, including a housing and an independent pumping cartridge for introduction into and dissociation from said housing, said cartridge comprising a rotor having a central recess, and provided with radial vanes and axial passageways between said vanes, a plate at each side of said rotor, one of said plates being provided with an input-output shaft having a common axis therewith, the other of said plates having passageways communicating with the passages in said rotor, a ring surrounding said rotor and vanes and disposed to float between said plates, and a single central member engaging the plates and passing through the rotor to combine them into an integral cartridge and subject them to a predetermined load and means for supplying fluid under pressure to said central recess.

11. A hydraulic device of the character referred to, including a housing and an independent rotary unit adapted for introduction into and dissociation from said housing, said unit comprising a rotor body having a plurality of radial vanes, fluid pasageways, a central recess and a ring surrounding said rotor, an end plate at each side of said rotor, one of said end plates having axial inlet-outlet passageways terminating at the face thereof, a plate valve in said housing having passageways for conducting fluid between said housing and inlet-outlet passageways in said end plate, a connection in said housing cooperating with said plate valve for conducting fluid under pressure to said recess, and means for boosting said pressure above the operating pressure between said vanes.

References Cited in the file of this patent

UNITED STATES PATENTS

| | | |
|---|---|---|
| 2,035,465 | Erskine et al. | Mar. 31, 1936 |
| 2,348,428 | Tucker | May 9, 1944 |
| 2,589,449 | Stageberg | Mar. 18, 1952 |
| 2,693,313 | McAdam | Nov. 2, 1954 |
| 2,711,286 | McAdam | June 21, 1955 |